June 10, 1941.  C. H. SCHETZER  2,244,730
CULINARY IMPLEMENT
Filed May 25, 1939   2 Sheets-Sheet 1
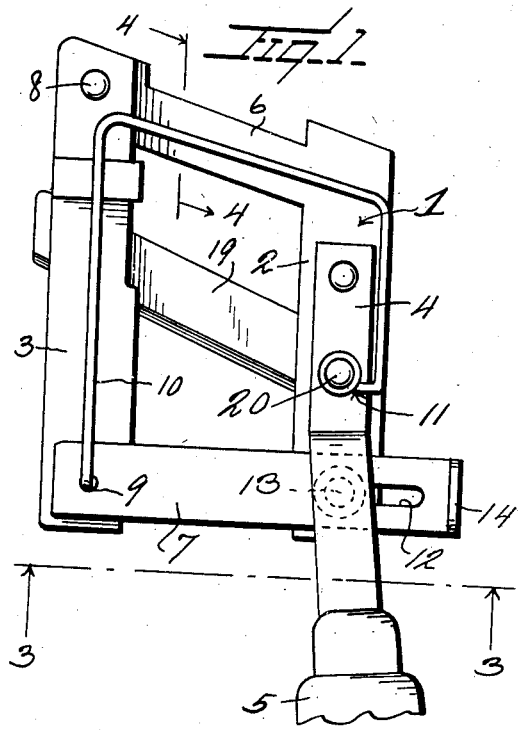
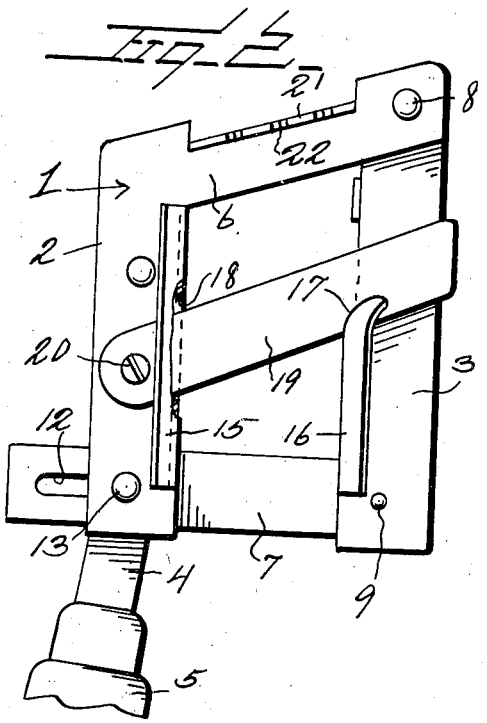
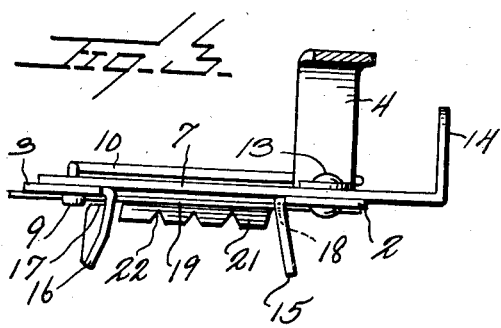
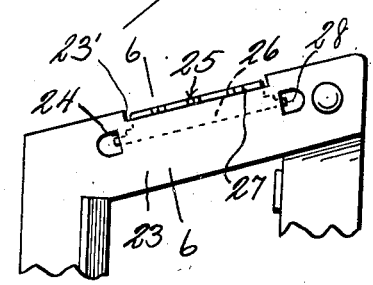
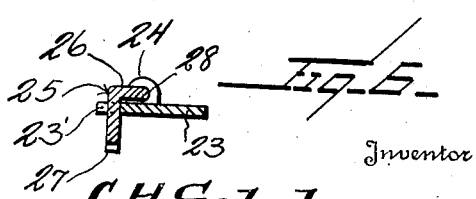
Inventor
C. H. Schetzer
By Watson E. Coleman
Attorney June 10, 1941.  C. H. SCHETZER  2,244,730
CULINARY IMPLEMENT
Filed May 25, 1939  2 Sheets-Sheet 2
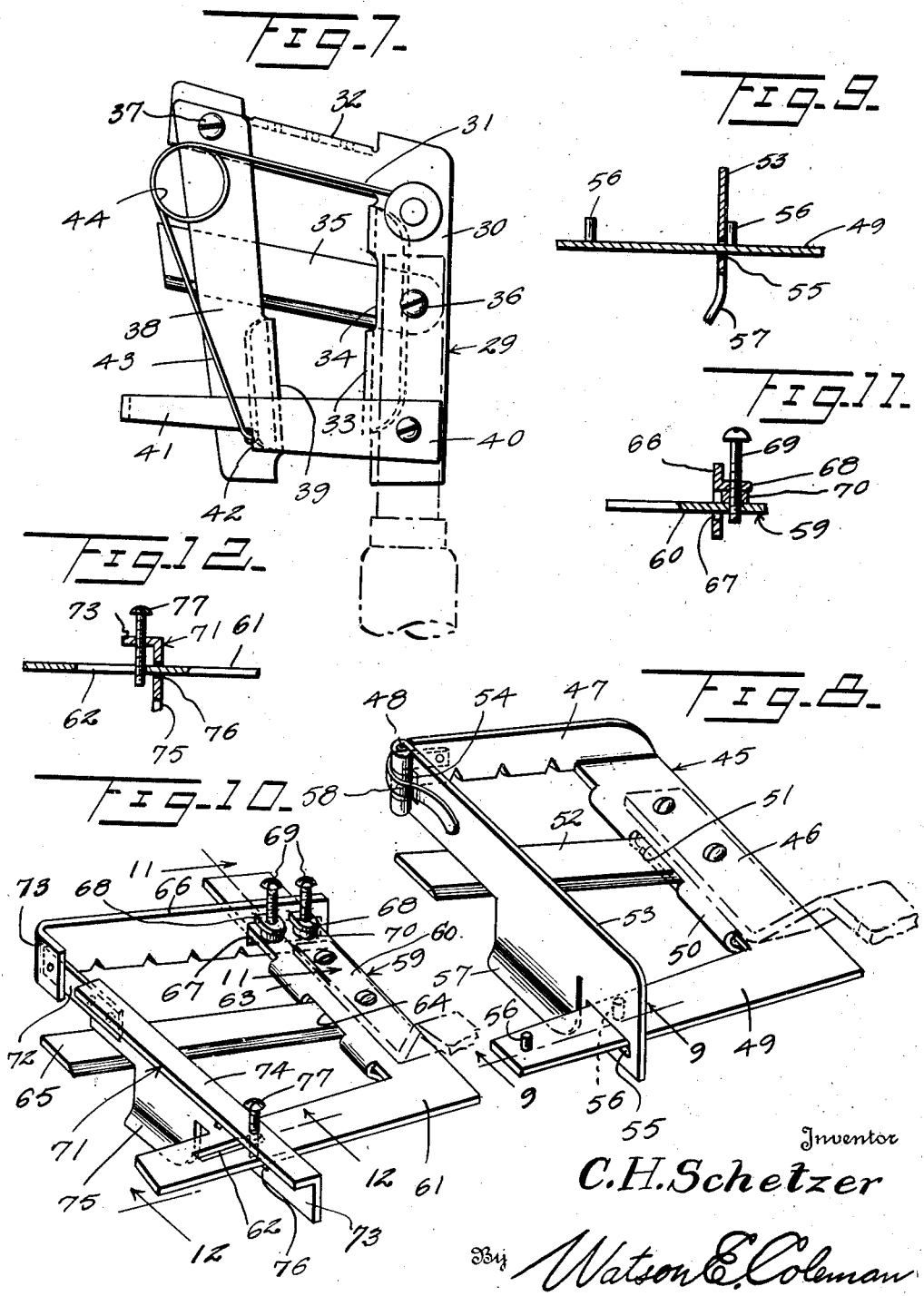

Patented June 10, 1941

2,244,730

UNITED STATES PATENT OFFICE 2,244,730

CULINARY IMPLEMENT

Charles H. Schetzer, North Portland, Oreg.

Application May 25, 1939, Serial No. 275,760

15 Claims. (Cl. 146—4)

This invention relates to the class of culinary implements and pertains particularly to a cutting device for removing kernels from ears of corn.

The present invention has for its primary object to provide a cutting implement which is designed to facilitate the operation of paring or removing the kernels from ears of corn without cutting from the cob the chaff or hull substance in which the kernels are fixed.

Another object of the invention is to provide in a cutting implement of the character described, a novel construction wherein the tops of the kernels are first cut off and the kernels are subsequently removed by a scraping action as the implement is drawn or pushed lengthwise of the ear of corn.

A further object of the invention is to provide in a parer for removing the kernels from ears of corn, a novel guide means for the cutting blade of the parer, whereby there may be obtained a uniform depth of cut as the parer is drawn lengthwise of the ear.

A still further object of the invention is to provide in a paring device of the character described, a novel means for regulating the depth of cut of a blade and a means associated with the blade whereby, after the outer ends or tips of the kernels have been cut off, the kernels will be removed from the cob by a scraping element without digging out or breaking away the hull portion of the cob in which the grains or kernels are fixed.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in plan of the implement embodying the present invention.

Fig. 2 is a view looking at the implement from the side opposite that shown in Fig. 1.

Fig. 3 is a sectional view on the line 3—3 of Fig. 1.

Fig. 4 is a section on the line 4—4 of Fig. 1.

Fig. 5 illustrates a modification of the scraper unit of the implement.

Fig. 6 is a section on the line 6—6 of Fig. 5.

Fig. 7 is a view in plan of a further modification of the invention.

Fig. 8 illustrates in perspective still another modified form of the invention.

Fig. 9 is a sectional view on the line 9—9 of Fig. 8.

Fig. 10 is a view in perspective of a further modified form of the invention.

Fig. 11 is a sectional view on the line 11—11 of Fig. 10.

Fig. 12 is a sectional view on the line 12—12 of Fig. 10.

Referring now more particularly to the drawings, the numeral 1 generally designates the body portion of the present implement which is in the form of an open frame of trapezoidal outline. This frame comprises the two side members 2 and 3 which are normally in substantially parallel relation and which might be referred to as the inner and outer members, respectively, for the reason that the member 2 which would be designated the inner member, has attached to the back thereof the angular bracket 4 which carries the handle 5. The bracket 4, by reason of its angular form, maintains the handle 5 in parallel relation with the side 2 of the body frame but in a plane offset therefrom so that the implement may be drawn lengthwise of an ear of corn as hereinafter described, without the handle or hand of the person grasping the handle coming into contact with the ear and interfering with the operation of the cutting unit.

At the forward end of the frame 1, the side members 2 are connected by the forward or head bar 6 which is disposed oblique to the side bars as shown, while at the back end, the bar 7 connects the side bars and has loose connection with the same for the purpose hereinafter set forth.

The forward end of the outer side portion 3 of the frame is pivotally attached at 8 to the head bar 6 while at its rear end a pivotal connection is established with the adjacent end of the rear bar 7 through the medium of the laterally turned end portion 9 of a spring wire yoke 10. This end 9 of the spring yoke passes through suitable apertures in the overlapped ends of the bars 3 and 7, and the yoke substantially follows the contour or outline of the frame and has its opposite end secured at 11 to the bracket 4 which carries the handle 5. The opposite or inner end of the rear bar 7 extends across the rear end of the side member 2 and is provided with the longitudinally extending slot 12 through which passes a securing element 13 which maintains the parts 2 and 7 in slidably connected relation.

The end of the bar 7 in which the slot 12 is formed is turned rearwardly to form the tip or finger piece 14 which facilitates shifting the bar 7 laterally while grasping the handle 5 in one end so as to oscillate the side portion 3 of the frame to increase or decrease the width of the frame at the rear thereof for the purpose hereinafter described.

The adjacent or inner edges of the side portions or bars 2 and 3 of the frame 1 have formed integrally therewith the longitudinally extending guide flanges 15 and 16, respectively. The flange 15 which is integral with the inner side bar 2, extends throughout the length of the inner edge of this bar while the flange 16, carried by the outer bar 3, extends only from a point adjacent the rear end of the bar through substantially half the length of the latter and at its forward end this flange is separated from the bar 3 to provide a guide slot 17. Intermediate the ends of the guide flange 15, there is formed through the flange a slot 18 and extending through this latter slot is a knife blade 19, the end adjacent the slot 18 being secured, as at 20, to the fixed or inner side bar 2 of the frame while the opposite end of the blade is maintained by its own inherent resiliency against the face of the outer side bar 3, the cutting edge of the blade being maintained in the slot 17. This blade 19 extends obliquely across the frame 1 in the same manner as the forward or head bar 6. It, therefore, is disposed at an oblique angle to the guides 16. The guides are also disposed at an angle with respect to the faces of the members to which they are attached so that these members 15 and 16 flare outwardly from the adjacent side or face of the frame.

The bar 6 at its forward edge has a portion thereof cut out and bent forwardly to form a scraper blade 21. The edge of this blade is notched or toothed, as indicated at 22. Upon reference to Fig. 3, it will be seen that the bar 7, the blade 19 and the toothed edge of the scraper blade 21 are all in spaced planes. The purpose for this will become apparent in the description of the use of the implement.

In Fig. 5 a modified construction of the scraper blade or unit is shown. In this figure merely the forward end of the frame structure is shown and the forward cross bar, corresponding to the bar 6 is indicated by the numeral 23. In this construction the forward edge of the bar 6 is cut out, as indicated at 23' and there are struck from the bar 23 at the ends of the cut out portion, the upturned ears 24, each of which is apertured for the purpose hereinafter described. Disposed between these ears 24 are the ends of one flange of an angle bar which is indicated generally by the numeral 25, this flange being designated 26 while the other or right angularly related flange, which is indicated at 27, normally positions in the cut out portion 23' to have its lower edge extended beyond the underface of the bar 23 in the same manner as the serrated or toothed edge 22 of the fixed bar 21. At each end of the angled portion 26 of the bar 25 there is formed a longitudinally extending trunnion 28 which pivotally engages in the aperture of the adjacent ear. With this scraper 25 mounted in the manner shown, it will be apparent that as the implement is drawn in one direction along an ear of corn for the purpose of cutting off the tips of the kernels by the action of the blade 19, the angle or flange 25 will swing away from the bar 23 so that by such oscillation of the bar, the kernels will not be scraped out but upon reversely moving the implement, the bar 25 will drop or swing back into place where the flanged portion 27 will engage the forward edge of the cut out portion 23' so that the flange will be held at right angles to the bar and the desired scraping action will be obtained.

In the use of the present implement, the frame is disposed against an ear of corn with the guide flanges 15 engaging the kernels. By then pressing the frame against the ear while at the same time drawing it lengthwise along the ear, the guide flanges 15 and 16 will spread or separate, according to the amount of pressure applied to the frame, and will guide the frame along the ear of corn and regulate the depth of cut of the blade into the kernels. By this means the tips of the kernels will be cut off. Following the cutting of the tips of the kernels, the scraper blade 21 will engage the kernels and scrape them free from the cob, but this scraping action will not break or cut off the chaff or hull substance in which the kernels are secured as the scraper blade is made of the proper width to merely remove the kernels without reaching the hull part of the cob.

From the description previously given of the construction and operation of the oscillatable scraper blade 25, it is believed its action will be readily apparent.

While the invention has been here illustrated as having the handle disposed with respect to the frame 1, so that the knife and scraper must be drawn toward the user of the implement, it will be readily understood that the handle may be placed in the reverse position if desired, so that the kernel removing operation may be performed by pushing the blade and scraper away from the operator. In either manner of using the implement, it will be understood that the cutting operation will be facilitated by placing the ear of corn with one end firmly against a suitable supporting body so that the ear can be steadied or held firm while the operation of cutting and removing the kernels is in progress.

While the implement is in use or as it is placed in operation, the shiftable bar portion 7 of the frame may be forced laterally by the engagement of the index finger of the hand gripping the handle 5, against the upwardly turned portion 14 so as to spread the guides to the desired degree for regulating the amount of kernel tip which will be cut away. It will be obvious that the wider apart the guides 15 and 16 are separated, the further down over the ear the frame will go and the deeper the blade will cut into the kernels.

While such construction has not been illustrated, it will be apparent that use may be made, if desired, of a longitudinally arcuate blade which will conform somewhat to the curvature of the ear of corn, in place of the straight blade shown.

By disposing the knife 19 obliquely to the line of movement of the frame, it will be obvious that a cleaner cutting action is obtained and by reason of the disposal of the scraping blade at the same angle, a self-cleaning action is obtained as the kernels tend to move laterally as they are scraped free so that there will be no interference by the removed kernels with the operation of loosening or removing those following.

It has previously been pointed out how the bar 7, the blade 19 and the toothed edge of the scraper blade 21 are all in spaced planes and in this connection, it is contemplated to vary the distance between planes of the blade 19 and the toothed edge of the scraper blade 21 by the employment, if necessary, of spacing washers between the blade 19 and the bar 2 to which it is attached or by other suitable means.

In Figs. 7 to 12, there are shown several other modifications of the present implement. In these figures, the frames only of the implements have been illustrated, the handles attached to the frame being merely designated in dotted outline. In Fig. 7 the frame which is generally indicated by the numeral 29, comprises the side portion 30 from the forward end of which there extends obliquely the rigid front or forward bar 31 from the forward edge of which there depends the scraper blade 32 corresponding with the toothed blade 21 of Fig. 2. The bar 30 has the handle secured thereto and its inner edge has the downwardly turned guiding wing 33 in which is a slot 34 to receive an end of the blade 35 which is pivotally attached to the bar 30 by the screw 36.

Pivotally attached by the pivot screw 37 to the outer or free end of the bar 31 is an oscillatable side bar 38 which corresponds with the movable or oscillatable bar 3 of the frame 1. This oscillatable bar 38 has the guide wing formed integral with its inner edge, as indicated at 39, the forward edge of this wing being engaged by the edge of the knife 35 to act as a guide therefor to maintain the knife in an oblique position across the frame substantially parallel with the scraper blade 32.

A transversely extending fixed rear bar 40 is secured at one end to the frame bar 30 and is cut out at 41 in its rear edge, as shown. This cut out portion has the rear end of the oscillatable bar 38 extended thereacross and the shoulder 42 which is formed by reducing the width of the bar 40, as indicated at 41, serves as a stop shoulder for an end of a spring 43 which is secured in the rear end of the oscillatable bar 38. The other end of this spring is secured to the forward end of the fixed side bar 30, the spring having intermediate its ends the loop 44 and the two end portions of the spring extending from the loop following the lines of the bars 31 and 38.

In the modified form in Fig. 8 the frame is indicated as a whole by the numeral 45 and in this form the rigid side bar 46, corresponding to the bars 2 and 30, has its forward end secured to a vertically disposed scraper bar 47, the outer or free end of which is formed to provide alined hinge knuckles.

The rear end of the bar 46 is integrally formed with the rear fixed cross bar 49 so that these three bars 46, 47 and 49 form a one-piece frame or unit. The inner edge of the bar 46 is formed to provide the downwardly turned guide wing 50 which is slotted, as at 51, to receive an end of the knife 52 which is pivotally attached to the bar 46.

Opposite the fixed side bar 46 is positioned the oscillatable bar 53 corresponding to the bars 3 and 38 of the other forms. This bar 53 has a hinge knuckle 54 which is alined between knuckles 48 and coupled therewith by a suitable pivot pin and in its free end it is slotted as indicated at 55, to receive the outer end of the fixed rear bar 49, as shown. The oscillatable bar 53, therefore, slides at its rear end on the free end of the bar 49 and its movement is limited by stop pins 56 carried by the bar 49. The lower edge of this bar 53 which is vertically arranged like the bar 47, as distinguished from the horizontal position of the bars 3 and 38, has the downwardly projecting guide wing 57 for coaction with the wing 50 in guiding the implement along an ear of corn.

The free end of the bar 53 is normally urged to swing inwardly so as to decrease the width of the frame, by the spring finger 58 which is attached at one end to the scraper bar 47 and extends around the hinge for engagement at its other end with the outer face of the oscillatable bar, in the manner shown.

In the modification illustrated in Fig. 10, the frame structure is indicated as a whole by the numeral 59 and in this form of the invention, there is the usual rigid side bar which is indicated at 60, and at its rear end this bar is integrally formed with the transverse rear bar 61 which is flat or horizontally arranged like the bars 40 and 49 and has near its free end the slot 62, the purpose of which will be described. From the inner edge of the bar 60 extends downwardly the guide wing 63 which is slotted at 64 to receive an end of the blade 65 which is pivotally attached to the bar 60 to extend across the frame.

The toothed scraper bar for this form of the implement is indicated at 66, and is a flat piece of metal vertically arranged like the bar 47 and provided at one end with the relatively wide longitudinally extending slot 67 through which the forward end of the side bar 60 extends. Suitable ears 68 formed integral with the scraper bar 66 carry adjusting screws 69 which are designed to engage in suitable threaded passages in the bar 60 which passes beneath the ears 68 so that by the interposition of washers 70 between the ears 68 and the bar 60, the bars 60 and 66 may be relatively adjusted so as to alter the distance between the planes occupied by the toothed edge of the scraper bar 66 and the blade 65.

At the opposite side of the frame 59, the oscillatable bar, indicated generally by the numeral 71, is disposed, this bar consisting of the two parts 72 and 73. The part 72 is in the form of a leaf spring which has one end firmly attached to the angularly turned end portion 73 of the scraper bar 66. The portion 73 of the oscillatable bar is of flat material vertically disposed and having an outwardly turned top edge flange 74 while extending from its lower edge is a guide wing 75 which coacts with the wing 63. The vertical portion of the part 73 is provided with a longitudinal slot 76 through which extends the slotted end of the fixed bar 61 and the flange 74 carries a screw 77 which slidably engages in the slot 62 to limit the inward and outward movement of the free end of the oscillatable bar.

The spring 72 is tensioned or biased so that it will constantly urge the free end of the bar of which it forms a part to move toward the bar 60.

In the modifications described, it will be apparent that certain features of the invention are common to all forms such as the frame having the obliquely extending transverse front bar with a rigid bar at one side and an oscillatable bar at the other side movable toward the rigid bar, the oscillatable bar and rigid bar carrying guide wings which facilitate the longitudinal movement of the implement along an ear of corn. Thus it will be seen that with all of the various forms of the invention described, the same desirable actions will be obtained which are the automatic regulation of the depth of cut for the blades and the subsequent scraping out or removal of the kernels from the ear.

What is claimed is:

1. An implement for removing kernels from an ear of corn, comprising a frame body, a handle secured to said frame body in an offset plane with respect thereto, said handle being designed to facilitate movement of the frame longitudinally of an ear of corn, a flat cutting blade carried by and extending across the frame and lying in a plane parallel with the plane of the frame, and a scraper unit disposed transversely of and carried by the frame, said scraper unit extending across the frame and having its edge directed obliquely to the path of movement of the frame whereby a self-cleaning action of the scraper is obtained.

2. An implement for removing kernels from an ear of corn, comprising a frame body, a handle secured to said frame body in an offset plane with respect thereto, said handle being designed to facilitate movement of the frame longitudinally of an ear of corn, a flat cutting blade carried by and extending across the frame and lying in a plane parallel with the plane of the frame, a scraper unit disposed transversely of and carried by the frame, and spaced members carried by and extending longitudinally of the frame and upon opposite sides thereof and projecting from the face of the frame opposite that face adjacent which the handle is disposed for facilitating regulation of the depth of cut of said blade.

3. An implement for removing kernels from an ear of corn, comprising a frame body, a handle secured to said frame body in an offset plane with respect thereto, said handle being designed to facilitate movement of the frame longitudinally of an ear of corn, a flat cutting blade carried by and extending across the frame and lying in a plane parallel with the plane of the frame, a scraper unit disposed transversely of and carried by the frame, and laterally separable elongated members carried by the frame upon opposite sides of the same and extending transversely of the blade for regulating the depth of cut of said blade when the frame is drawn longitudinally of an ear of corn, said members being so constructed and arranged that their separation is facilitated by pressing the frame toward the ear.

4. A device for removing kernels from an ear of corn, comprising an elongated frame having parallel side bars and transversely extending front and rear connecting bars, one of said side bars being pivotally attached to the front bar and to the rear bar, said front bar being slidably attached to the other one of the side bars, a handle secured to the said other one of the side bars to facilitate movement of the frame longitudinally along an ear of corn, guides carried by the side bars and projecting from the face of the frame opposite the face to which the handle is joined, resilient means normally urging the pivoted bar toward the other side bar, a knife blade extending across between said side bars and secured at one end to the said other one of the side bars, and a scraper member carried by the front bar and projecting therefrom upon the same face of the frame as said guides, said guides operating to guide the frame longitudinally of the ear and to facilitate control of the cutting depth of the knife.

5. A device for removing kernels from an ear of corn, comprising an elongated frame having parallel side bars and transversely extending front and rear connecting bars, one of said side bars being pivotally attached to the front bar and to the rear bar, said front bar being slidably attached to the other one of the side bars, a handle secured to the said other one of the side bars to facilitate movement of the frame longitudinally along an ear of corn, guides carried by the side bars and projecting from the face of the frame opposite the face to which the handle is joined, resilient means normally urging the pivoted side bar toward the other side bar, a knife blade extending across between said side bars and secured at one end to the said other one of the side bars, and a scraper member carried by the front bar and projecting therefrom upon the same face of the frame as said guides, said scraper being disposed obliquely across the frame, said guides contacting the ear longitudinally and facilitating guiding the frame along the ear and regulating the cutting depth of the knife.

6. A device for removing kernels from an ear of corn, comprising an elongated frame having parallel side bars and transversely extending front and rear connecting bars, one of said side bars being connected to the front and rear bars to have movement relative to the other side bar, a handle secured to the said other side bar to facilitate movement of the frame longitudinally along an ear of corn, guides carried by and extending longitudinally of the side bars and projecting from the face of the frame opposite the face to which the handle is joined, resilient means normally urging the pivoted side bar toward the other side bar, a knife blade extending across between said side bars and secured at one end to the said other one of the side bars, said guides contacting the ear longitudinally and facilitating guiding the frame along the ear and regulating the cutting depth of the knife and a scraper member carried by the front bar and projecting therefrom upon the same face of the frame as said guides, said scraper exending across the frame and being pivotally mounted at its ends and adapted to oscillate to an inoperative position when the frame is drawn in one direction for cutting the tips of the kernels and to an operative position for scraping free the kernels when the frame is moved in the opposite direction.

7. An implement for removing kernels from an ear of corn, comprising a frame having a fixed side bar, a handle attached to said bar, a scraper bar extending across the frame from the fixed bar, a blade attached at one end to the fixed bar and extending across the frame, a shiftable side bar pivotally attached at one end to the scraper bar, resilient means normally urging oscillation of the shiftable bar toward the fixed bar, and guide means carried by and extending longitudinally of the fixed and shiftable bars and serving to guide the frame along the ear and to facilitate regulating the cutting depth of the blade.

8. An implement for removing kernels from an ear of corn, comprising a frame having a fixed side bar, a handle attached to said bar, a scraper bar extending across the frame from the fixed bar, a blade attached at one end to the fixed bar and extending across the frame, a shiftable side bar pivotally attached at one end to the scraper bar, resilient means normally urging oscillation of the shiftable bar toward the fixed bar, guide means carried by and extending longitudinally of the fixed and shiftable bars and serving to guide the frame along the ear and to facilitate regulating the cutting depth of the blade, and a rear transverse bar attached at one end to said fixed bar and having at its other end slidable connection with the shiftable bar to act as a supporting guide therefor.

9. An implement for topping kernels and removing the same from an ear of corn, comprising a frame having a fixed side bar, a handle attached to said bar, a transverse bar connected at one end with the side bar, a blade pivotally attached at one end to the side bar to extend across the frame, the said blade and bars being of flat material and disposed in parallel planes, a scraper bar of flat material extending transversely of and perpendicular to the plane of the frame upon the same side of the frame as the blade and upon the side of the blade opposite its cutting edge, the scraper bar being attached at one end to the fixed bar, an oscillatable side bar coupled at one end with the scraper bar for movement relative to the fixed side bar and having its other end in crossed relation with the said transverse bar, a sliding connection between the oscillatable bar and the transverse bar limiting the oscillatory movement of the oscillatable bar, resilient means normally urging the oscillatable bar to swing toward the fixed side bar, and wing members carried by and extending longitudinally of the oscillatable and the fixed side bars on the same sides thereof as said blade.

10. An implement for topping kernels and removing the same from an ear of corn, comprising a frame having a fixed side bar, a handle attached to said bar, a transverse bar connected at one end with the side bar, a blade pivotally attached at one end to the side bar to extend across the frame, the said blade and bars being of flat material and disposed in parallel planes, a scraper bar of flat material extending transversely of and perpendicular to the plane of the frame upon the same side of the frame as the blade and upon the side of the blade opposite its cutting edge, the scraper bar being attached at one end to the fixed bar, an oscillatable side bar coupled at one end with the scraper bar for movement relative to the fixed side bar and having its other end in crossed relation with the said transverse bar, a sliding connection between the oscillatable bar and the transverse bar limiting the oscillatory movement of the oscillatable bar, resilient means normally urging the oscillatable bar to swing toward the fixed side bar, wing members carried by and extending longitudinally of the oscillatable and the fixed side bars on the same side thereof as the blade, the said sliding connection between the oscillatable bar and the fixed rear bar consisting of a slot in the oscillatable bar through which the rear bar extends, and stop means carried by one of the bars for engagement by the other bar to limit the oscillatory movement of the oscillatable bar.

11. An implement for topping kernels and removing the same from an ear of corn, comprising a frame having a fixed side bar, a transverse bar connected at one end with the side bar, a scraper bar comprising a flat body of material extending transversely of and disposed perpendicular to the plane of the frame and having a slot in one end for the reception of said side bar, means connecting the scraper bar with the side bar facilitating adjustable movement of the side bar vertically of the scraper bar, a handle secured to the side bar, a blade attached at one end to the side bar and extending across the frame substantially parallel with the scraper bar, an oscillatable side bar comprising a portion of rigid material and a portion of resilient material, said portion of resilient material being attached at one end to the other end of the scraper bar and being biased to normally move the free end of the oscillatable bar toward the fixed side bar, said fixed side bar and oscillatable bar carrying longitudinally extending guide wings upon the same side of the frame as the blade and the rigid portion of the oscillatable bar having a slot through which the free end of said transverse bar extends, the said free end of the transverse bar having a longitudinal slot therein, and a screw carried by the rigid portion of the oscillatable bar and engaging in the slot of the transverse bar to limit relative movement of the oscillatable and transverse bars.

12. An implement for topping kernels and removing the same from an ear of corn, comprising a substantially rectangular frame having a fixed side bar, a transversely disposed bar joined at one end to said side bar, a flat scraper bar joined at one end to said side bar and disposed in a plane perpendicular to the plane of the frame and in spaced relation with said transverse bar, a movable side bar disposed in spaced relation with the fixed bar, means resiliently coupling one end of said movable side bar with the end of the scraper bar remote from the fixed bar, a sliding connection between said movable side bar and the other end of said transverse bar designed to permit limited relative movement between the movable bar and the fixed side bar, a knife attached at one end to said fixed bar and extending transversely of the frame in a plane transverse to the plane of and spaced from an edge of the scraper bar, means facilitating varying the distance between the plane of said blade and the said edge of the scraping bar, means carried by the said fixed and movable side bars facilitating guiding the frame longitudinally of an ear of corn, and handle means connected with said frame.

13. An implement for topping kernels and removing the same from an ear of corn, comprising a substantially rectangular frame having a fixed side bar, a transverse bar connected at one end with an end of the side bar, a scraper bar disposed transversely to said side bar in spaced relation with the transverse bar and having a scraping edge directed perpendicularly to the plane of the frame, means joining the scraper bar to the fixed bar facilitating moving the scraper bar in a direction transversely to the plane of the frame, a movable side bar spaced from the fixed bar, resilient means coupling an end of the movable bar with the end of the scraper bar remote from the fixed bar, a coupling between the other end of the movable bar and the other end of the transverse bar constructed and arranged to allow limited movement of the movable bar with respect to the fixed bar, said resilient means normally urging the movable bar towards the fixed bar, a cutting blade attached at one end to said fixed bar and extending transversely of the frame and disposed in a plane spaced from the plane of the scraping edge of the scraping bar, guide means carried by the fixed and movable bars upon the same side of the frame as said blade for facilitating movement of the frame longitudinally of an ear of corn, and handle means attached to said frame.

14. An implement for topping kernels and removing the same from an ear of corn, comprising a substantially rectangular frame having a fixed side bar, a transverse bar connected at one end with an end of the side bar, a scraper bar disposed transversely to said side bar in spaced relation with the transverse bar and having a scraping edge directed perpendicularly to the plane of the frame, means joining the scraper bar to the fixed bar facilitating moving the scraper bar in a direction transversely to the plane of the frame, a movable side bar spaced from the fixed bar, resilient means coupling an end of the movable bar with the end of the scraper bar remote from the fixed bar, a coupling between the other end of the movable bar and the other end of the transverse bar constructed and arranged to allow limited movement of the movable bar with respect to the fixed bar, said resilient means normally urging the movable bar towards the fixed bar, a cutting blade attached at one end to said fixed bar and extending transversely of the frame and disposed in a plane spaced from the plane of the scraping edge of the scraping bar, guide means carried by the fixed and movable bars upon the same side of the frame as said blade for facilitating movement of the frame longitudinally of an ear of corn, handle means attached to said frame, the said joining means between the scraper bar and the fixed side bar comprising an ear carried by one bar and disposed in spaced relation with the adjacent bar, and an adjusting screw threaded through said ear and through the said adjacent bar.

15. An implement for removing kernels from an ear of corn, comprising a rectangular frame having two oppositely disposed side members and having one of the said two side members movable in the plane of the frame with respect to the member opposite thereto whereby the width of the frame may be varied, a handle secured at one end to the frame, a blade secured at one end to the frame to extend transversely with respect to the frame and the said movable side member, a corn ear engaging wing carried by each of the said opposite members, said wings forming guides between which the corn ear is located, and a scraper member carried by the frame at the rear of said blade.

CHARLES H. SCHETZER.